Dec. 27, 1955  M. A. GILMAN  2,728,229

THERMOMETER SHAKER

Filed Aug. 23, 1952

INVENTOR
Marvin A. Gilman
BY
Philip G. Hilbert
ATTORNEY

United States Patent Office 2,728,229
Patented Dec. 27, 1955

2,728,229

THERMOMETER SHAKER

Marvin A. Gilman, Croton-on-Hudson, N. Y., assignor to Clay-Adams, Inc., a corporation of New York Application August 23, 1952, Serial No. 306,019

3 Claims. (Cl. 73—373)

This invention relates to a device for shaking one or more thermometers to lower the mercury levels thereof.

An object of this invention is to provide an improved device of the character described which includes a removable thermometer holder adapted to carry a substantial number of thermometers, to facilitate carriage of the thermometers to the shaker as well as to allow for easy washing, rinsing and disinfecting of the individual thermometers.

Another object of this invention is to provide an improved device of the character described which occupies a minimum amount of space, operates an inclined thermometer holder at a speed sufficient to efficiently reduce the mercury levels of the thermometers contained therein and is of simplified construction so as to facilitate insertion and removal of the thermometers.

A further object of this invention is to provide a thermometer shaker having a motor operated head and a thermometer holder removably mounted on the head yet frictionally engageable therewith to allow conjoint rotation, together with improved spring means which insures frictional engagement of the head and holder.

Still another object of this invention is to provide in a thermometer shaker, an improved thermometer holder of simple, compact construction which may carry a large number of thermometers, includes means for properly positioning the thermometers on the holder and means for draining liquid carried on the thermometers during the shaking operation.

Other objects of this invention will in part be obvious and in part hereinafter pointed out.

The invention consists in the elements of construction and arrangement of parts as will be exemplified in the embodiment hereinafter described, the scope of invention being indicated in the claims following.

Figure 1:
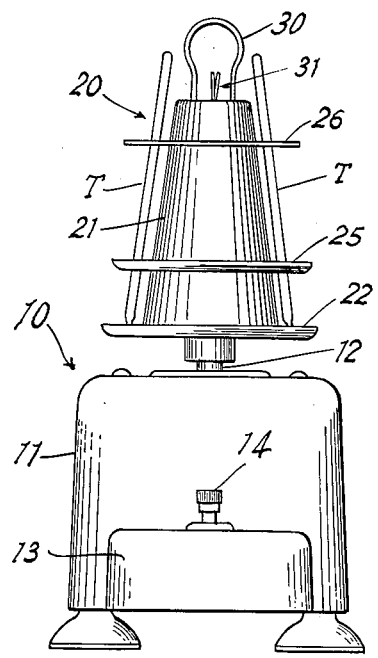
Fig. 1 is a front elevational view of a thermometer shaker embodying the invention.
Figure 3:
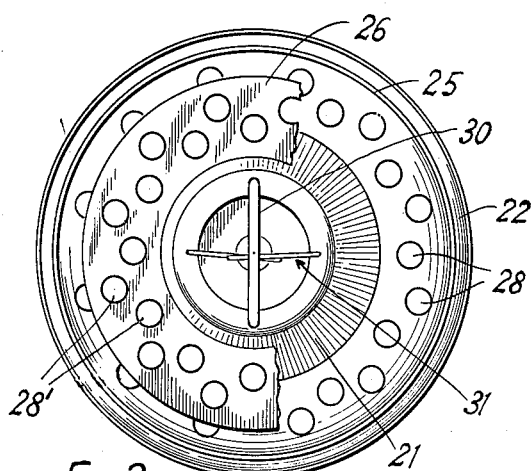
Fig. 3 is a top plan view thereof, with portions broken away.
Figure 4:
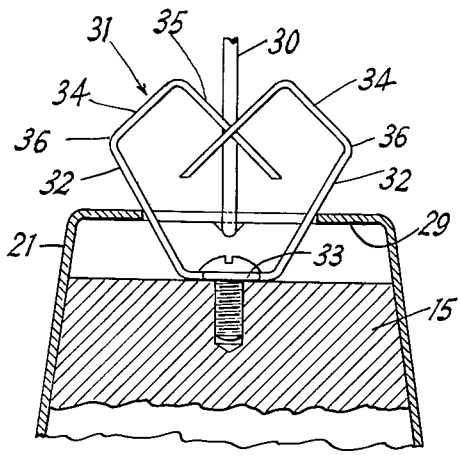
Fig. 4 is a vertical sectional view of the upper portion of the head and holder assembly, showing the spring.
Figure 2:
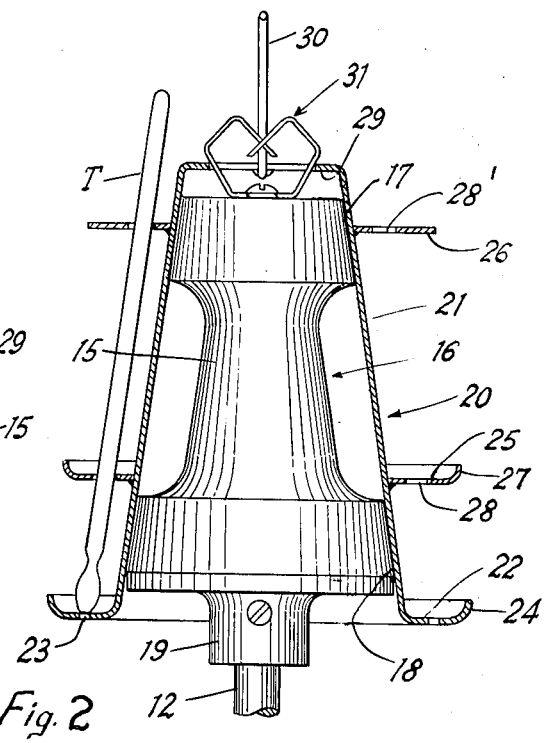
Fig. 2 is a front elevational view of the head and holder assembly, with parts in section.

Referring in detail to the drawing and particularly to Fig. 1, 10 designates a thermometer shaker embodying the invention. The same comprises a casing generally designated as 11 within which is positioned an electric motor, not shown, said motor having a vertical shaft 12 projecting upwardly from the top of the casing. The casing 11 includes an extension 13 on the front thereof for enclosing a switch, not shown, having an operating button 14, for controlling the operation of the motor.

A head 15 is mounted on shaft 12. The head is of substantially frustoconical shape with an intermediate portion removed as at 16 to reduce the weight thereof and leaving an upper surface 17 and a lower surface 18. An extension 19 at the lower end of the head is axially bored to receive the shaft 12 and a set screw fixes the head to the shaft.

A thermometer holder generally indicated at 20, is adapted to be removably mounted on the head 15. The holder includes a frustoconical wall 21 which is rolled at its lower end to form an outwardly extending radial flange 22 formed with circumferentially spaced, small openings 23 and an upwardly turned peripheral lip 24, for the purposes hereinafter appearing.

A pair of spaced, outwardly extending radial flanges 25, 26 are fixed to the outer surface of wall 21, as by soldering, welding or the like; the topmost flange 26 being spaced below the top edge of wall 21 and the flange 25 being located intermediate the flanges 22, 26. The flange 25 includes an upturned peripheral lip 27. The flanges 25, 26 are formed with openings 28, 28' which are in alignment to allow the thermometers T to be inserted therein, the bottom of the inserted thermometers being supported on flange 22. The lips 24, 27 prevent the lower ends of the thermometers from slipping outwardly of the flanges while being inserted in the flange openings 28, 28'.

The holder 20 further includes an inwardly extending radial flange 29 at the top edge of wall 21, for the purpose hereinafter described; and a wire loop handle 30 extending upwardly from flange 29.

Opposite portions of surfaces 17, 18 of head 15 subtend an angle of about 16.5° and the inclination of the wall 21 of holder 20 is such as to make the inner surface of the wall complementary to the surfaces 17, 18 of the head.

It is understood that thermometers T which have been used, may be readily inserted in the holder 20 to allow the same to be carried to a station where the holder is supported by flange 22 and the thermometers may be washed with detergent solutions, rinsed in water and disinfected in germicide without removing the same from the holder, thus minimizing breakage due to excessive handling which is eliminated.

After the thermometers have been thus cleaned, the carrier or holder 20 with the thermometers in place, is mounted on the head 15 of the shaker so that the inner surface of the holder wall 21 makes frictional contact with the surfaces 17, 18 of the head. Such frictional contact is insured by means of a spring 31 which is fixed to the apex or top surface of the head.

The spring 31 is made of resilient wire having a pair of diverging arm portions 32 interconnected at their bottom ends by a coil portion 33 and connected at their upper ends to a pair of converging arm portions 34. Extending downwardly from the upper ends of arm portions 34 are end portions 35 in crossed relation. When mounting the holder 20 on the head 15, the flange 29 on the holder first engages the spring arm portions 34 and on pressing the holder downwardly, the spring arms are moved toward each other to allow the flange to pass the angular junctures 36 of the spring arm portions. When the flange 29 on the holder passes below the angular junctures 36 on the spring, the spring arm portions are free to move away from each other and bias the holder downwardly so as to insure intimate contact between the inner surface of wall 21 of the holder and surface portions 17, 18 of the head.

Upon suitable connection of a conductor cord, not shown, extending from the motor in casing 11, to an outlet and pressing the button 14, the motor is energized to rotate the head and the holder which frictionally engages the head. The motor, which may rotate at about 3000 R. P. M. will in approximately 5 seconds, provide centrifugal action sufficient to shake down the thermometers positioned in the holder at an acute angle relative to the rotational axis of head 15. While the head is being rotated the thermometers are dried and any excess liquid drains off through openings 23 in the bottom flange 22. Release of the button 14 after the 5 second period deenergizes the motor and the holder may be readily removed from the head by means of handle 30. The spring arms readily compress to allow the flange 29 on the holder to pass the angular junctures 36.

It is understood that the holder may be provided with any suitable number of openings to accommodate a desired number of thermometers. With the spring bias on the holder, a non-uniform distribution of thermometers about the wall 21 of the holder, assuming that only a few thermometers are to be shaken down, will not affect the frictional engagement of the holder with respect to the head.

In order to identify individual thermometers, the openings 28' on flange 26 may be numbered.

It is apparent that a plurality of holders may be used with each shaker to allow one set of thermometers to be shaken while another set in a separate holder is being washed.

The device occupies a minimum amount of space, operates at high speed efficiency and permits quick engagement and disengagement of the holder in respect to the rotatable head.

It will be apparent that there has been provided an improved thermometer shaker in which is achieved the several objects of the invention and which is well adapted for practical use.

As various possible embodiments might be made of the above described invention, and as various changes might be made in the embodiment shown and described herein, it is to be understood that all matter herein set forth or shown in the accompanying drawing is to be interpreted as illustrative and not in a limiting sense.

Having thus described my invention, I claim as new and desire to protect by Letters Patent:

1. A thermometer shaker comprising a rotatable head having upstanding frustoconical outer surface portions, a portable thermometer holder having frusto-conical side wall portions conforming to and engageable with the outer surface portions of said head and an inwardly extending radial flange at the upper end of said side wall portions, and spring means on the apex of said head comprising a pair of oppositely disposed arms resiliently engageable with said flange for urging said holder side wall portions into frictional contact with the outer surface portions of said head, said arms being compressible toward each other to permit the removal of said holder from said head.

2. A portable holder for supporting a plurality of elongated articles to be subjected to centrifugal action upon rotation of said holder about a longitudinal axis thereof, said holder comprising a thin walled hollow member open at the lower end thereof to receive means for rotating the holder, a radial flange extending outwardly of said member at the open end thereof providing means for supporting said holder on a base upon removal thereof from said rotating means and further providing rest means for the lower ends of said articles and flange means extending radially outward of said walled member at a point longitudinally spaced above the open end thereof and including article positioning means for engaging intermediate portions of said articles, said article positioning means being displaced inwardly relative to said rest means whereby said articles are inclined toward the longitudinal rotational axis of said member.

3. A portable holder for supporting elongated articles to be subjected to centrifugal action upon rotation of said holder about a longitudinal axis thereof, said holder comprising a pair of longitudinally spaced and coaxially related circular flanges, a tubular member open at the lower end thereof and coaxially related to said flanges, the inner edges of said flanges extending to the outer surface of said member, one of said flanges being located adjacent the open end of said member and providing rest means for the lower ends of said articles, the other of said flanges being formed with circumferentially spaced openings displaced inwardly relative to said one flange for receiving intermediate portions of said articles and positioning said articles in inclined relation to the rotational axis of said member, and means at the upper end of said member for transporting said holder.

References Cited in the file of this patent

UNITED STATES PATENTS

| Number | Name | Date |
|---|---|---|
| 618,196 | Ashworth et al. | Jan. 24, 1899 |
| 739,275 | Abbe | Sept. 22, 1903 |
| 785,635 | Peterson | Mar. 21, 1905 |
| 857,763 | Smith | June 25, 1907 |
| 913,457 | Bestman | Feb. 23, 1909 |
| 1,622,990 | Bonsieur | Mar. 29, 1927 |
| 1,730,776 | Lundgren | Oct. 8, 1929 |
| 2,141,500 | Woodall | Dec. 27, 1938 |
| 2,179,839 | Brosnan | Nov. 14, 1939 |
| 2,269,859 | Owen | Jan. 13, 1942 |
| 2,389,635 | Place | Nov. 27, 1945 |
| 2,424,166 | Hillenbrand | July 15, 1947 |
| 2,447,330 | Grebmeier | Aug. 17, 1948 |
| 2,488,087 | Krovitt | Nov. 15, 1949 |
| 2,699,289 | Allen et al. | Jan. 11, 1955 |